(12) United States Patent
Stokes et al.

(10) Patent No.: US 11,781,296 B2
(45) Date of Patent: Oct. 10, 2023

(54) SHOWER TRIM ASSEMBLY

(71) Applicant: KOHLER CO., Kohler, WI (US)

(72) Inventors: Andrew James Stokes, Mazomanie, WI (US); Michael J. Strege, Plymouth, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 17/514,525

(22) Filed: Oct. 29, 2021

(65) Prior Publication Data

US 2022/0162837 A1 May 26, 2022

Related U.S. Application Data

(60) Provisional application No. 63/116,285, filed on Nov. 20, 2020.

(51) Int. Cl.
*E03C 1/04* (2006.01)
*F16B 7/18* (2006.01)

(52) U.S. Cl.
CPC ............ *E03C 1/0409* (2013.01); *F16B 7/182* (2013.01)

(58) Field of Classification Search
CPC .. E03C 1/0409; E03C 1/0408; E03C 2201/50; F16K 27/12
See application file for complete search history.

(56) References Cited

U.S. PATENT DOCUMENTS

| | | | |
|---|---|---|---|
| 1,932,099 A | 10/1933 | Cabana | |
| 2,076,918 A | 4/1937 | Robison | |
| 2,593,677 A | 4/1952 | Jakeway | |
| 2,807,827 A | 10/1957 | Brooks | |
| 2,820,655 A | 1/1958 | Hileman | |
| 3,082,473 A | 3/1963 | West | |
| 3,311,943 A | 4/1967 | Budai | |
| 3,593,550 A | 7/1971 | Berkowitz | |
| 3,829,139 A | 8/1974 | Storlie | |

(Continued)

FOREIGN PATENT DOCUMENTS

| CN | 203145574 U | 8/2013 |
|---|---|---|
| CN | 205577618 U | 9/2016 |

(Continued)

OTHER PUBLICATIONS

Floor Anchors, PYI Inc., retrieved on Nov. 11, 2021 from https://www.pyiinc.com/floor-anchors.html.

(Continued)

*Primary Examiner* — Reinaldo Sanchez-Medina
(74) *Attorney, Agent, or Firm* — FOLEY & LARDNER LLP

(57) ABSTRACT

A valve trim assembly for use in a shower environment. The valve trim assembly includes an outer covering and a valve assembly. The outer covering includes a first axis disposed through a midpoint of the outer covering. The valve assembly is at least partially disposed within the outer covering and configured to control a flow of fluid. The valve assembly includes a nut coupled to the outer covering, an adapter at least partially disposed within the nut and rotatable about the first axis, and an elongated joint coaxially aligned with the adapter. The nut and the adapter cooperatively define a joint where the adapter rotates within the nut to maintain engagement between the outer covering and a wall.

12 Claims, 11 Drawing Sheets

(56) References Cited

U.S. PATENT DOCUMENTS

| | | | |
|---|---|---|---|
| 5,071,099 A | 12/1991 | Kuo | |
| 5,186,197 A | 2/1993 | Lavine | |
| 5,887,927 A | 3/1999 | Kurek et al. | |
| 6,113,045 A | 9/2000 | Kuo | |
| 6,343,808 B1 | 2/2002 | Luh | |
| 6,581,245 B2 | 6/2003 | Jen | |
| 6,651,830 B2 | 11/2003 | Pan | |
| 6,796,442 B1 | 9/2004 | Wu | |
| 6,925,686 B2 | 8/2005 | Heathcock et al. | |
| 6,959,480 B2 | 11/2005 | Wing et al. | |
| 6,966,101 B2 | 11/2005 | Chiang | |
| 7,077,150 B2 | 7/2006 | McNerney | |
| 7,367,535 B2 | 5/2008 | Lai | |
| 7,509,971 B2 | 3/2009 | Kajuch | |
| 7,926,772 B2 | 4/2011 | Lowe et al. | |
| 7,942,161 B2 | 5/2011 | Crompton | |
| 8,176,934 B2 * | 5/2012 | Niver | F16K 27/12 137/359 |
| 8,439,593 B2 | 5/2013 | Slater et al. | |
| 8,459,920 B2 | 6/2013 | Selle | |
| 9,062,796 B2 | 6/2015 | Horsman et al. | |
| 9,328,488 B2 | 5/2016 | Van Leyen et al. | |
| 9,725,889 B2 * | 8/2017 | Wilson | E03C 1/021 |
| 9,909,287 B2 | 3/2018 | Van Leyen et al. | |
| 10,174,532 B2 | 1/2019 | Couturier | |
| 2002/0104946 A1 | 8/2002 | Lai | |
| 2005/0034381 A1 | 2/2005 | Bartmann et al. | |
| 2006/0175496 A1 | 8/2006 | Lai | |
| 2009/0242713 A1 | 10/2009 | Lowe et al. | |
| 2010/0132810 A1 | 6/2010 | Pompian | |
| 2011/0110716 A1 | 5/2011 | Slater et al. | |
| 2012/0145854 A1 | 6/2012 | Smith | |
| 2014/0007381 A1 | 1/2014 | Huang | |
| 2015/0128383 A1 | 5/2015 | Ryan | |
| 2015/0152975 A1 | 6/2015 | Jonte | |
| 2016/0135550 A1 | 5/2016 | Drage | |
| 2020/0088317 A1 | 3/2020 | Bai et al. | |
| 2021/0214966 A1 | 7/2021 | Odom | |
| 2021/0324658 A1 | 10/2021 | Cronin et al. | |
| 2021/0363779 A1 | 11/2021 | Bennett et al. | |
| 2022/0170292 A1 | 6/2022 | Dulmes et al. | |

FOREIGN PATENT DOCUMENTS

| | | |
|---|---|---|
| CN | 208518454 U | 2/2019 |
| EP | 0 463 398 B1 | 1/1992 |
| GB | 0 623 461 | 5/1949 |
| GB | 0 895 532 | 5/1962 |
| KR | 19990033474 | 8/1999 |

OTHER PUBLICATIONS

Amazon.com, "Pulse ShowerSpas 3001-RIV-PB-BN Tru-Temp Mixing Valve, Pressure Balance Rough-In Valve Trim Kit, Round, 1/2" NPT, Brushed Nickel, Internet URL: https://www.amazon.com/PULSE-ShowerSpas-3001-RIV-PB-BN-Tru-Temp-Pressure/dp/B014XGO15G/ref=sr_1_2?crid=2QGREI94V6IAL&keywords=pulse%2Btru%2Btemp%2Bpressure%2Bbalanced%2Bvalve%2Btrim&qid=1691767713&sprefix=pulse%2Btru%2Btemp%2Bpressure%2Bbalanced%2Bvalve%2Btri%2Caps%2C122&sr=8-2&th=1, First Available Sep. 1, 2015.

Amazon.com, "Zurn Z7300-SS-MT Tub And Shower Valve", Internet URL: https://www.amazon.com/Zurn-Z7300-SS-MT-Tub-Shower-Valve/dp/B001P1ZJX6/ref=sr_1_16_sspa?crid=2QGREI94V6IAL&keywords=pulse tru temp pressure balanced valve trim&qid=1691767713&sprefix=pulse tru temp pressure balanced valve tri%2Caps%2C122&sr=8-16-spons&sp_csd=d2lkZ2VOTmFtZT1zcF9tdGY&psc=1, First Available Sep. 9, 2009.

* cited by examiner

SHOWER TRIM ASSEMBLY

CROSS REFERENCE TO RELATED PATENT APPLICATION

This application claims the benefit of and priority to U.S. Provisional Patent Application No. 63/116,285 filed Nov. 20, 2020, the entire disclosure of which is incorporated by reference herein.

BACKGROUND

The present disclosure relates generally to fluid control valves and corresponding trim assemblies for mounting a shower fixture. More specifically, the present disclosure relates to a shower valve trim assembly that can remain perpendicular to a wall when there is variation in the alignment of a valve for mounting a shower fixture.

Generally speaking, the installation of valves in buildings can result in some misalignment between the valves and the respective walls that they are installed adjacent to. This misalignment may be due a variety of factors including, but not limited to, valve installer error and installation of the wall. Misalignment may cause the valve trim assembly installed on the valve to also be misaligned relative to the wall. Misaligned valve trim may cause accelerated wear on components, improper sealing of components, and may be less aesthetically pleasing. Accordingly, an assembly that can adjust for this misalignment that is simple and easy to install would be desirable.

SUMMARY

At least one embodiment relates to a valve trim assembly for use in a shower environment. The valve trim assembly includes an outer covering and a valve assembly. The outer covering includes a first axis disposed through a midpoint of the outer covering. The valve assembly is at least partially disposed within the outer covering and configured to control a flow of fluid. The valve assembly includes a nut coupled to the outer covering, an adapter at least partially disposed within the nut and rotatable about the first axis, and an elongated joint coaxially aligned with the adapter. The nut and the adapter cooperatively define a joint where the adapter rotates within the nut to maintain engagement between the outer covering and a wall.

Another example embodiment relates to a universal joint. The universal joint includes a first annular body and a second annular body. The first annular body includes a first engagement structure positioned along at least a portion of an outer face of the first annular body, a first axis disposed through a midpoint of the first annular body, and a slot recessed at least partially into a body of the first annular body. The slot is positioned proximate to a first end of the first annular body. The second annular body is at least partially disposed within the first annular body and rotatable about the first axis. The second annular body includes a second engagement structure at least partially disposed along an inner face of the second annular body and a second axis disposed through a midpoint of the second annular body. The second annular body is rotationally offset from the first annular body when the first axis is offset from the second axis. The second annular body and the first annular body cooperatively define a joint.

Another example embodiment relates to a method of manufacturing a valve assembly. The method includes forming a nut having an annular body with a bore extending therethrough. The nut has a flange extending perpendicular from the body on a first end of the nut and a first threaded interface positioned at a second end of the nut. The method further includes forming an adapter having an annular body with a second threaded interface disposed therein. The adapter has a flange extending perpendicular from a first end of the adapter. The adapter further defines a conical structure where a diameter of the first end of the adapter is greater than a diameter of a second end of the adapter. The method further includes forming a valve stem having an elongate body. The valve stem has a third threaded interface at least partially disposed on an external surface of the valve stem.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, disclosed herein are various embodiments of a valve trim assembly. The valve trim assembly remains perpendicular to a wall when there is variation in the alignment of a valve. According to an exemplary embodiment, the disclosed valve trim assembly includes a valve that is coupled to a floating adapter, a locking nut, and a joint. The valve may include some misalignment between the orientation of the valve and the wall it is adjacent to. The floating adapter engages an external thread of the valve. The floating adapter includes an external collar. The external collar engages an internal protrusion of the locking nut. The external collar is positionable relative to the internal protrusion. This allows for the locking nut to be aligned to a desirable position before installing the escutcheon plate. An external thread of the locking nut then engages an internal thread of the escutcheon plate. In this manner, the escutcheon plate may be aligned perpendicular to the wall. This allows for the overall alignment of the valve trim assembly to be aligned perpendicular to the wall.

Figure 1:
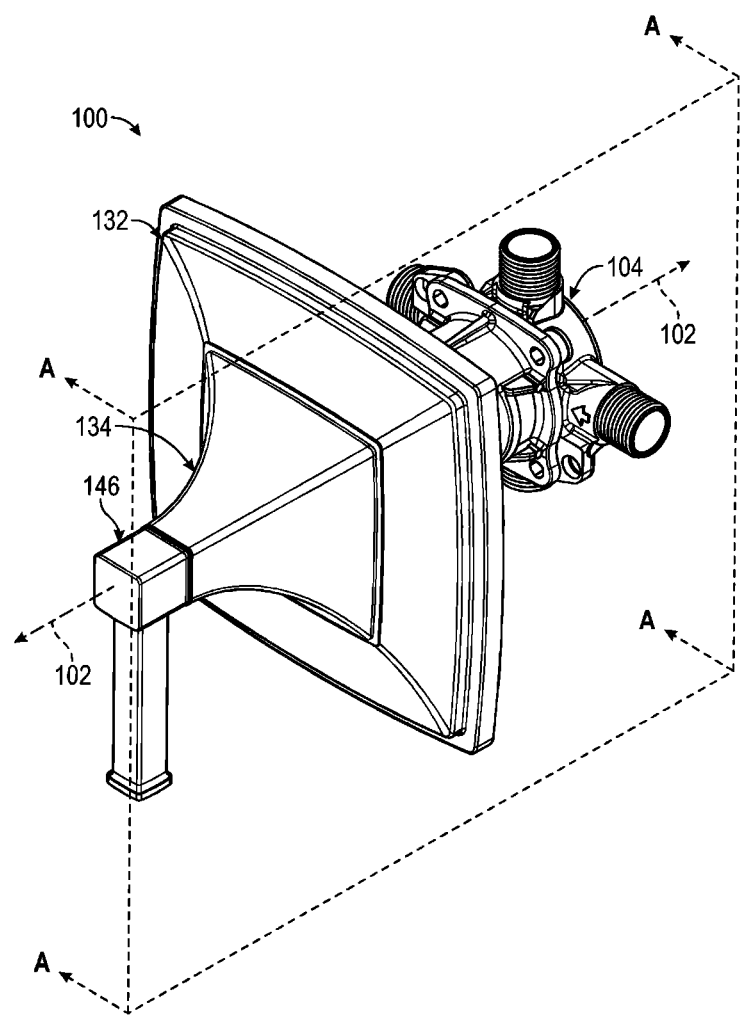
FIG. 1 is a perspective view of a valve trim assembly, according to an exemplary embodiment.

Referring now to FIG. 1, a valve trim assembly 100 is shown according to an exemplary embodiment. The valve trim assembly 100 is centered on a center axis 102. The center axis 102 is perpendicular to a wall in which the valve trim assembly 100 is disposed within. It is advantageous to minimize the deviation between an axis perpendicular to the center axis 102 relative to the wall to mitigate accelerated wear on components, improper sealing of components, and to be more aesthetically pleasing. The valve trim assembly 100 comprises a number of housings, shown as escutcheon plate 132, escutcheon flange 134, and handle assembly 146. The number of housings 132, 134, 146 may be coaxially aligned along the center axis 102. The number of housings 132, 134, 146 may be coupled together by a fastening mechanism (e.g., fastener, shaft, joint, etc.). The handle assembly 146 may include a handle, where the handle extends in a direction substantially perpendicular to the center axis 102. In some embodiments, the handle may extend in a direction substantially parallel to the center axis 102 (e.g., at least 1 degrees off the center axis 102, 2 degrees off the center axis 102, 5 degrees off the center axis 102, 15 degrees off the center axis 102, 30 degrees off the center axis 102, etc.).

Figure 2:
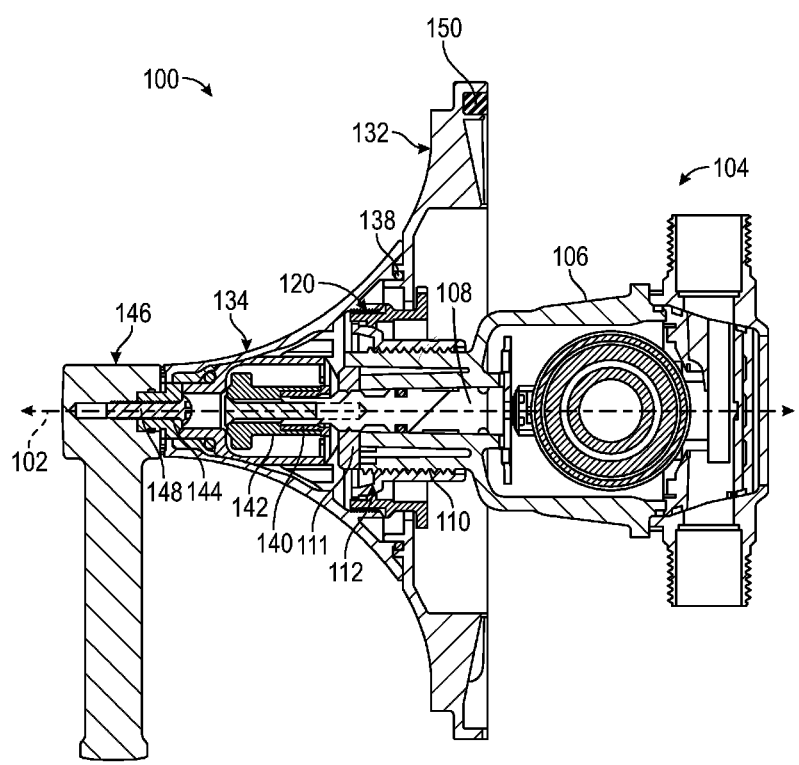
FIG. 2 is a cross-sectional side view of the valve trim assembly of FIG. 1 taken along plane A-A in FIG. 1, according to an exemplary embodiment.
Figure 3:
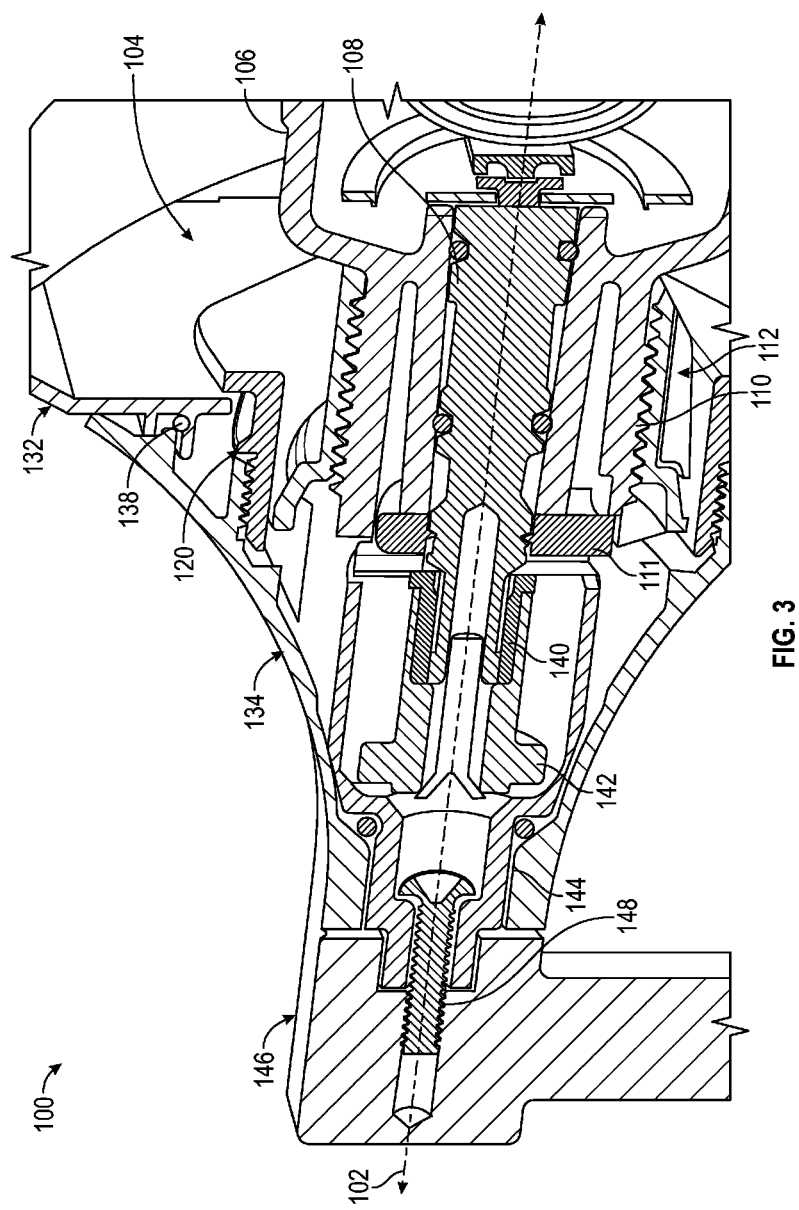
FIG. 3 is a portion of a first cross-sectional perspective view of the valve trim assembly of FIG. 1 taken along plane A-A in FIG. 1, according to an exemplary embodiment.

Referring generally to FIGS. 1-3, the escutcheon plate 132 may abut the wall and can conceal the hole in the wall in which a portion of the valve assembly 104 is disposed within. The escutcheon plate 132 may further prevent water ingress from entering within the hole in the wall. This is advantageous as it prevents structural damage and/or mold to the interior of the wall (e.g., wooden planks, insulation, etc.). In occurrences where the escutcheon plate 132 is not perpendicular to the wall, water may enter into the hole through a cavity between the escutcheon plate 132 and the wall. The escutcheon plate 132 may be in confronting relation to a mating surface 130 (shown in FIG. 7) of a locking nut 120. After the locking nut 120 is fastened into place, it retains the escutcheon plate 132 relative to the wall.

Referring still to FIGS. 1-3, the escutcheon flange 134 may abut the escutcheon plate 132 when in an assembled position. The escutcheon flange 134 may include a number of flange internal threads 136. The flange internal threads 136 may be threadably engaged to a number of locking external threads 128. In this manner, the escutcheon flange 134 is in confronting relation to the escutcheon plate 132. The escutcheon flange 134 is disposed concentric to the center axis 102. The escutcheon flange 134 includes a curved cavity that is tapered towards the center axis 102 as it extends away from the escutcheon plate 132. The curved cavity may at least contain components of the valve trim assembly 100 disposed within. In some embodiments, the curved cavity may be tapered away from the center axis 102.

Referring still to FIGS. 1-3, the handle assembly 146 may be rotational repositionable about the center axis 102. By way of example, the handle assembly 146 may be reposi-tionable such to actuate at least one of a shower assembly between an on and off position, a cold water assembly, a hot water assembly, or the like. The valve trim assembly 100 includes a valve assembly 104. The valve assembly 104 is utilized in the shower assembly, but may be also used for various other applications such as a sink faucet. The valve assembly 104 may control the temperature of fluid (e.g., water, etc.) outputted from a faucet. By way of example, the valve assembly 104 may be operably coupled to at least one of a hot water inlet, a cold water inlet, and a diverter assembly. The valve assembly 104 may be at least partially disposed within the concave cavity of the escutcheon flange 134. In some embodiments, the valve assembly 104 may be disposed outside of the concave cavity of the escutcheon flange 134.

Referring still to FIGS. 1-3, the valve trim assembly 100 also includes a gasket 138 (e.g., O-ring, sealing ring). The gasket 138 may be positioned within a channel of the escutcheon plate 132. The channel of the escutcheon plate 132 may be positioned along an outer edge of the escutcheon plate 132, distal the center axis 102. In some embodiments, the channel of the escutcheon plate 132 may be positioned along an inner edge of the escutcheon plate 132, proximate the center axis 102. The gasket 138 may be interposed between the escutcheon plate 132 and the escutcheon flange 134. The gasket 138 may mitigate water ingress into an interior portion of the valve trim assembly 100 between the escutcheon plate 132 and the escutcheon flange 134. To be more precise, the gasket 138 may be a crushed O-ring so that once the valve trim assembly 100 is assembled, the gasket 138 may compress to at least partially seal off the valve trim assembly 100. In some embodiments, the gasket 138 may completely seal the valve trim assembly 100.

Referring still to FIGS. 1-3, the valve trim assembly 100 also includes a spline adapter 140 (e.g., elastic surface). The spline adapter 140 may be disposed at the second end of the valve stem 108 and may be composed of an elastic material. In some embodiments, the valve stem 108 may be composed of a metallic material, composite material, or the like. The spline adapter 140 may maintain structural rigidity within the valve trim assembly 100. Due to the misalignment of the valve stem 108 relative to the center axis 102, the user may experience a degree of play when rotating the handle of the handle assembly 146. This degree of play results in less precise control when rotating the handle. Additionally, the degree of play also results in a less desirable experience for the user. The spline adapter 140 may act as a dampener at the second end of the valve stem 108. In this manner, the spline adapter 140 minimizes play within the valve trim assembly 100. The spline adapter 140 may be further configured to arrange the handle assembly 146 into a vertical position. That is, when the spline adapter 140 is substantially misaligned, the handle assembly 146 can be repositionable into a substantially vertical position via a specific thread arrangement.

Referring still to FIGS. 1-3, the valve trim assembly 100 also includes a joint 142 (e.g., connector). The joint 142 is coupled to the end of a valve stem 108. In some embodiments, the valve trim assembly 100 may be used with a joint as described in U.S. Pat. No. 9,725,889, but may also be used with other types of joints (e.g., ball-and socket, hinge, etc.). The joint 142 may translate the rotational motion provided by the user via the handle to the end of the valve stem 108. The joint 142 may also compensate for the misalignment of the valve stem 108 relative to the handle of the valve trim assembly 100. Due to the arrangement of the joint 142, the joint 142 may also provide the user a more desirable experience by minimizing the rotational force required to rotate the handle of the handle assembly 146. In this manner, the user may have precise control when rotating the handle of the handle assembly 146.

Referring still to FIGS. 1-3, the valve trim assembly 100 also includes a stem driver 144. The joint 142 may be at least partially disposed within a cavity of the stem driver 144. An exterior surface of the stem driver 144 may be profiled to be in confronting relation to an internal surface of the escutcheon flange 134. In this manner, the joint 142 may be positioned within the stem driver 144 to adjust for the misalignment of the valve stem 108 while reducing play between the escutcheon flange 134 and the joint 142. In an exemplary embodiment, the stem driver 144 may be composed of a polymer. In some embodiments, the stem driver 144 is composed of metal. The stem driver 144 may include ribs circumferentially disposed along a length of the stem driver 144. The ribs may be configured to abut an inner surface of the joint 142 when the stem driver 144 is assembled into the joint 142. As can be appreciated, the ribs may define a substantially equivalent diameter to that of the stem driver 144 so that the stem driver 144 is tightly received within the joint 142. In some embodiments, the ribs may be angular (e.g., barbed) to allow movement in one direction and prohibit movement in another direction. The ribs may be further configured to prevent backlash between at least the stem driver 144 and the joint 142.

Referring still to FIGS. 1-3, the handle assembly 146 is coupled to the stem driver 144. The user rotates the handle assembly 146 to a desired position. Rotation of the handle assembly 146 results in coincident rotation of the stem driver 144. The rotation of the stem driver 144 results in the joint 142, and consequently, the valve stem 108 to also rotate. The position of the handle may adjust at least one of the hot-cold ratio and flow rate of the water. In some embodiments, the handle assembly 146 includes multiple handles. In these embodiments, each handle alters various parameters of the water. The handle assembly 146 may include a handle bolt 148 (shown in FIG. 2). The handle bolt 148 may be concentric to the center axis 102 and may couple the handle assembly 146 to the escutcheon flange 134.

Referring still to FIGS. 1-3, the valve assembly 104 includes a mixing valve 106. The mixing valve 106 may be disposed behind (e.g., not exposed to a user of the valve trim assembly 100) the wall. The mixing valve 106 may adjust a hot-cold water ratio by the user rotating the handle of the handle assembly 146. The mixing valve 106 may also adjust the amount of water flow (e.g., water volume of water per time interval) through the user rotating the handle of the handle assembly 146. In some embodiments, the hot-cold water ratio and the water flow are controlled by several mixing valves. According to an exemplary embodiment, the mixing valve 106 may be operably coupled to a diverter mechanism, where the diverter mechanism may direct water between a showerhead and a faucet.

Referring still to FIGS. 1-3, the valve assembly 104 also includes a valve stem 108. A first end of the valve stem 108 may be coupled to the mixing valve 106 and may rotate radially relative to the center axis 102. Rotation of the valve stem 108 results in the mixing valve 106 adjusting the hot-cold water ratio and/or the water flow. Due to variations in the installation of the valve assembly 104, the distance between the valve stem 108 and the center axis 102 increases along the length of the valve stem 108 as it extends away from the wall.

Referring still to FIGS. 1-3, the valve assembly 104 may also include valve external threads 110. The valve external threads 110 may be disposed on an external surface of the valve assembly 104 and extend coincidently (e.g., along the same axis) as the valve stem 108. The valve trim assembly 100 also includes a dampener 111 (e.g., rubber gasket, etc.). The dampener 111 may be disposed at a second end of the valve stem 108 and may absorb any play (e.g., movement of components when engaging with other components) of the valve stem 108 when the user rotates the handle of the handle assembly 146.

Referring still to FIGS. 1-3, the valve trim assembly 100 also includes a floating adapter 112 (e.g., positionable collar) coupled to the valve assembly 104. That is, the floating adapter 112 may be coupled the valve assembly 104 to the number of housings 132, 134, 146. The locking nut 120 may retain the floating adapter 112 in such a way to compensate for angle variation between the center axis 102 and the axis of the valve assembly 104. The floating adapter 112 may be operatively coupled to the locking nut 120 where the floating adapter 112 and the locking nut 120 cooperatively define a ball and socket (e.g., ball joint, joint, etc.) where the floating adapter 112 may rotate within. That is, the floating adapter 112 and the locking nut 120 may maintain full contact between the escutcheon plate 132 and the wall when the valve assembly 104 is not oriented perpendicular from the escutcheon plate 132 along the center axis 102. The floating adapter 112 may be offset from the center axis 102 at a distance that still enables the escutcheon plate 132 to seat flush against the wall upon installation. The angle may be 1 degree off the center axis 102, 2 degrees off the center axis 102, 3 degrees off the center axis 102, 15 degrees off the center axis 102, 30 degrees off the center axis 102, etc. until the floating adapter 112 abuts an inner wall of the locking nut 120. By way of example, the floating adapter 112 may be offset from the center axis 102 by an angle of 5 degrees. The floating adapter 112 may include an engagement structure, shown as adapter internal threads 114, which are threadingly engaged to an engagement structure, shown as valve external threads 110, of the valve assembly 104. By threadingly engaging to the valve assembly 104, the floating adapter 112 also extends coincidently relative to the valve stem 108. In some embodiments, the floating adapter 112 may be coupled to the valve assembly 104 by alternate manufacturing methods (e.g., crimping, seaming, adhesive, welding, etc.).

According to an exemplary embodiment, the valve trim assembly 100 may be configured to accommodate a valve rough-in depth (i.e., valve depth within a finished wall) up to 1.5 inches. In some embodiments, the valve trim assembly 100 may be configured to accommodate a valve rough-in depth greater than 1.5 inches.

Referring still to FIGS. 1-3, the valve trim assembly 100 includes a second gasket, shown as gasket 150. The gasket 150 is disposed along an outer edge of the escutcheon plate 132. The gasket 150 may be a gasket having a rectangular cross section. In some embodiments, the gasket 150 may have a circular cross section. In still some embodiments, the gasket 150 may have any geometrical cross section. The gasket 150 may further extend along three sides of the escutcheon plate 132, where a bottom of the escutcheon plate 132 does not include the gasket 150. The gasket 150 may be configured to prevent water ingress into the valve trim assembly 100. In some embodiments, the gasket 150 may be configured to prevent water ingress out of the valve trim assembly 100. When in an assembled position, the gasket 150 may abut the escutcheon plate 132 and the wall such to seal a surface between the gasket 150 and the wall.

Figure 4:
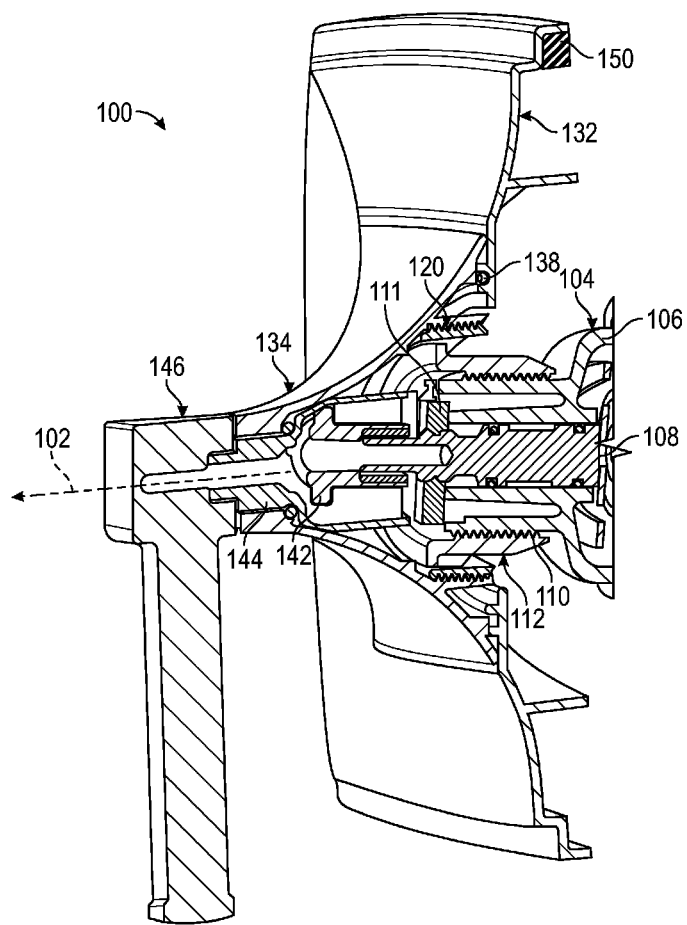
FIG. 4 is second cross-sectional perspective view of the valve trim assembly of FIG. 1 taken along plane A-A in FIG. 1, according to an exemplary embodiment.

Referring now to FIG. 4, the valve trim assembly 100 is shown when the floating adapter 112 is offset by 5 degrees. As shown, the joint 142 is offset within the stem driver 144 such that a midpoint of the joint 142 may be positioned distal to the center axis 102. In some embodiments, the midpoint of the joint 142 may be coaxially aligned with the center axis 102. The floating adapter 112 may further be coaxially aligned with the valve assembly 104 so that the adapter internal threads 114 may maintain full thread engagement with the valve external threads 110. As can be appreciated, full thread engagement between the floating adapter 112 and the valve assembly 104 be advantageous to maintain rigidity within the valve trim assembly 100.

Figure 5:
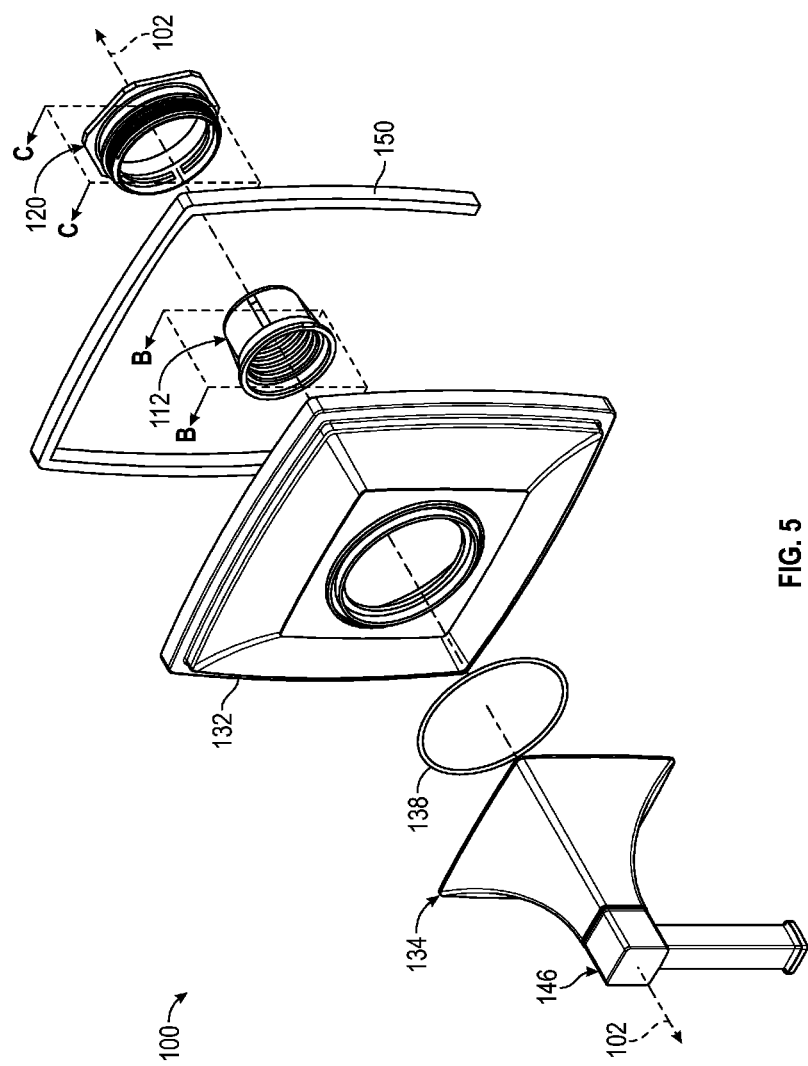
FIG. 5 is an exploded view of the valve trim assembly of FIG. 1, according to an exemplary embodiment.

Referring now to FIG. 5, an exploded view of the valve trim assembly 100 is shown. As shown in FIG. 5, the components of the valve trim assembly 100 may be coaxially aligned along the center axis 102. According to an exemplary embodiment, the floating adapter 112 and the locking nut 120 may be positioned along an axis offset to the center axis 102 by an incremental amount (e.g., 1 degree, 2 degrees, 3 degrees, 15 degrees, 30 degrees, etc.). That is, the floating adapter 112 and the locking nut 120 may act as a ball and socket where the floating adapter 112 may be at least partially disposed within the locking nut 120. As can be appreciated, when the valve assembly 104 (shown in FIG. 4) is not aligned along the center axis 102, the floating adapter 112 may rotate within the locking nut 120 to allow the escutcheon plate 132 to be positioned flush with the wall.

Referring still to FIG. 5, the valve trim assembly 100 may be packaged where the components of the valve trim assembly 100 come pre-assembled. That is, the escutcheon plate 132 is coupled to the handle assembly 146 where the escutcheon flange 134 is rotated to thread the floating adapter 112 onto the valve assembly 104 until the escutcheon plate 132 abuts the wall.

Figure 6:
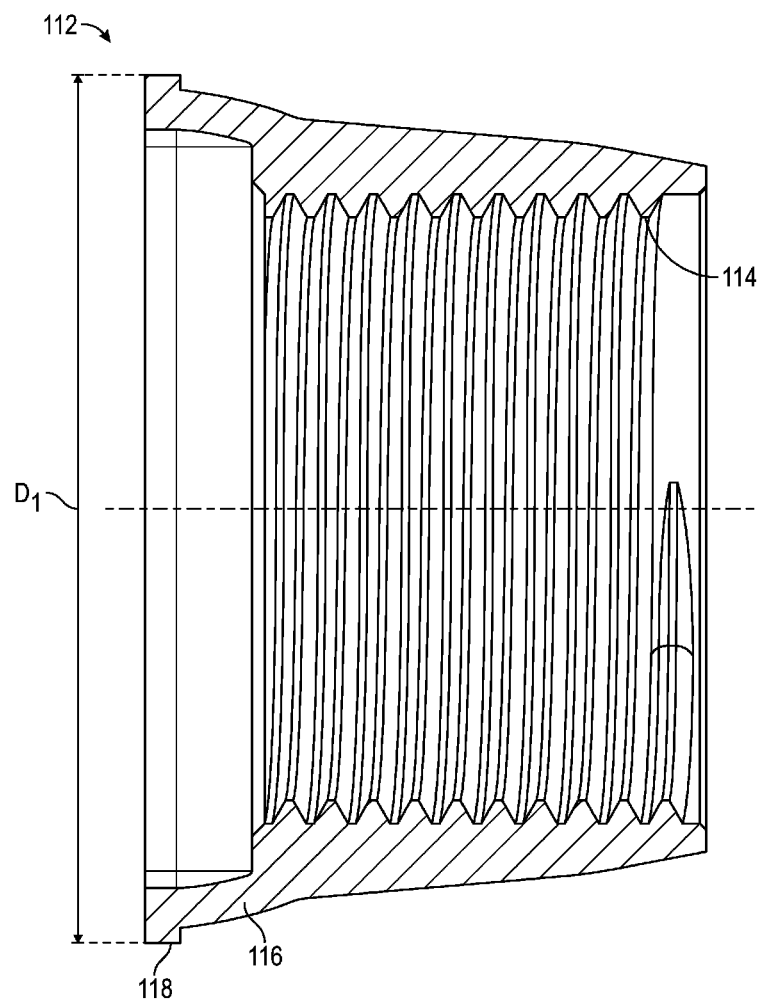
FIG. 6 is a cross-sectional view of a floating adapter for a valve trim assembly taken along plane B—B in FIG. 5, according to an exemplary embodiment.

Referring now to FIG. 6, the floating adapter 112 also includes an external flange 116 (e.g., a curved profile). The external flange 116 extends away from the center axis 102. In some embodiments, the external flange 116 extends perpendicular from the center axis 102. The floating adapter 112 also includes a collar 118 (e.g., an external protrusion). The collar 118 is contiguous to the external flange 116. The collar 118 may be disposed at an axial end of the floating adapter 112 where the collar 118 may abut at least one of the escutcheon flange 134 (shown in FIG. 2) and the locking nut 120 (shown in FIG. 2). In various embodiments, the collar 118 may be disposed anywhere along the external flange 116. The collar 118 defines a diameter $D_1$. The diameter $D_1$ may be the diameter of the floating adapter 112 from one end of the collar 118 to another end of the collar 118. As shown, the adapter internal threads 114 are fully disposed along an inner wall of the floating adapter 112. In some embodiments, the adapter internal threads 114 are partially disposed along the inner wall of the floating adapter 112.

Figure 7:
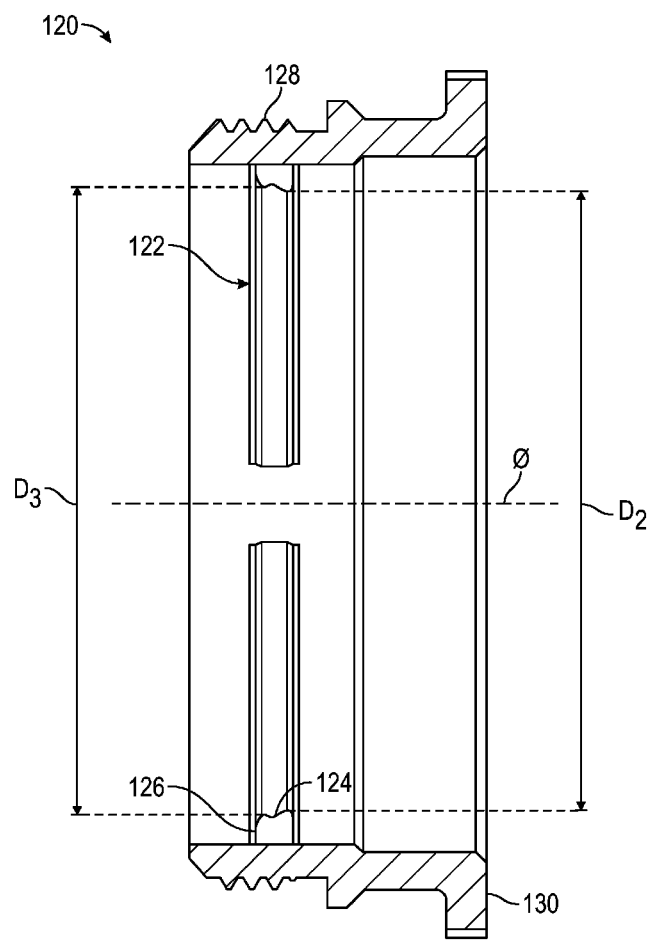
FIG. 7 is a cross-sectional view of a locking nut for a valve trim assembly taken along plane C-C in FIG. 5, according to an exemplary embodiment.

Referring to FIG. 7, a cross-sectional view of the locking nut 120 is shown, taken along line C-C of FIG. 5. The locking nut 120 retains the floating adapter 112 (shown in FIG. 2) into place between the locking nut 120 and the valve assembly 104 (shown in FIG. 2). The locking nut 120 may include an internal protrusion 122 (e.g., an inner ring). The internal protrusion 122 is disposed in an inner surface of the locking nut 120. The internal protrusion 122 is profiled in a manner so that the locking nut 120 may realign itself after coupling to a misaligned floating adapter 112. The internal protrusion 122 may include an inclined surface 124 (e.g., an angled or sloped surface). The inclined surface 124 may abut the external flange 116 of the collar 118. The inclined surface 124 defines an inner diameter $D_2$ and an outer diameter $D_3$. The inner diameter $D_2$ may be the diameter of the locking nut 120 taken along the inclined surface 124. The inner diameter $D_2$ may increase linearly as the internal protrusion 122 extends away from the wall. Because of the profile of the inclined surface 124, the external flange 116 may be positioned before being in confronting relation to the inclined surface 124. In this manner, the locking nut 120 can remain coincident to the center axis 102 while coupling to the floating adapter 112 that is misaligned.

Referring still to FIG. 7, the internal protrusion 122 further includes a flat profile 126 (e.g., a planar surface). The flat profile 126 is contiguous to the inclined surface 124. The flat profile 126 may be in confronting relation to the collar 118 when the floating adapter 112 is fastened to the locking nut 120. The flat profile 126 defines the outer diameter $D_3$ where the outer diameter $D_3$ is larger than the diameter $D_1$. In this manner, the locking nut 120 may be positioned to compensate for misalignment of the floating adapter 112 while retaining the floating adapter 112. The outer diameter $D_3$ may be larger than the inner diameter $D_2$. The locking nut 120 also includes an engagement structure, shown as locking external threads 128. The locking external threads 128 are disposed adjacent to a first end of the locking nut 120. The locking external threads 128 are also disposed on the exterior of the locking nut and are threadingly engage the locking nut 120 to other components of the valve trim assembly 100. The locking nut 120 also includes a mating surface 130 (e.g., coupling surface). The mating surface 130 is disposed at a second end of the locking nut 120. In an exemplary embodiment, the mating surface 130 is a flat profile that may interpose (e.g., fix a component in place by disposing it in confronting relation to other components) the locking nut 120 to other components of the valve trim assembly 100.

Figure 8:
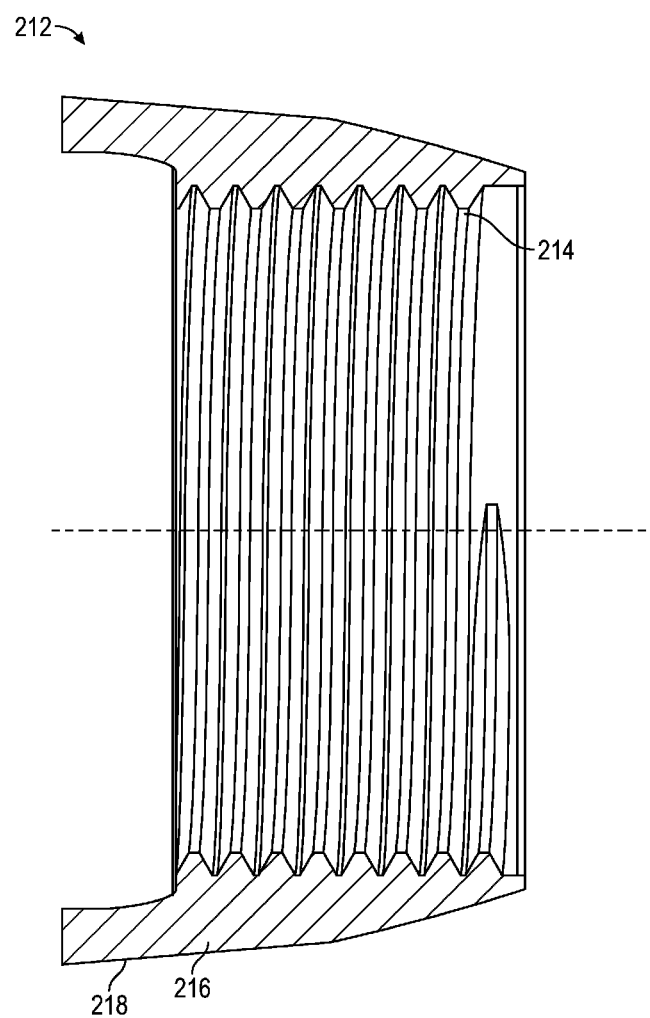
FIG. 8 is a cross-sectional side view of a floating adapter, according to an exemplary embodiment.

Referring to FIG. 8, a cross-sectional side view of a floating adapter 212 is shown, according to an example embodiment. The floating adapter 212 includes an engagement structure, shown as adapter internal threads 214, and an external flange 216. The floating adapter 212 is similar to the floating adapter 112 however, it may include a less pronounced (e.g., less extruded) collar 218. As can be appreciated, the floating adapter 212 may be more structurally rigid and, as such, may be able to take on increased loading.

Figure 9:
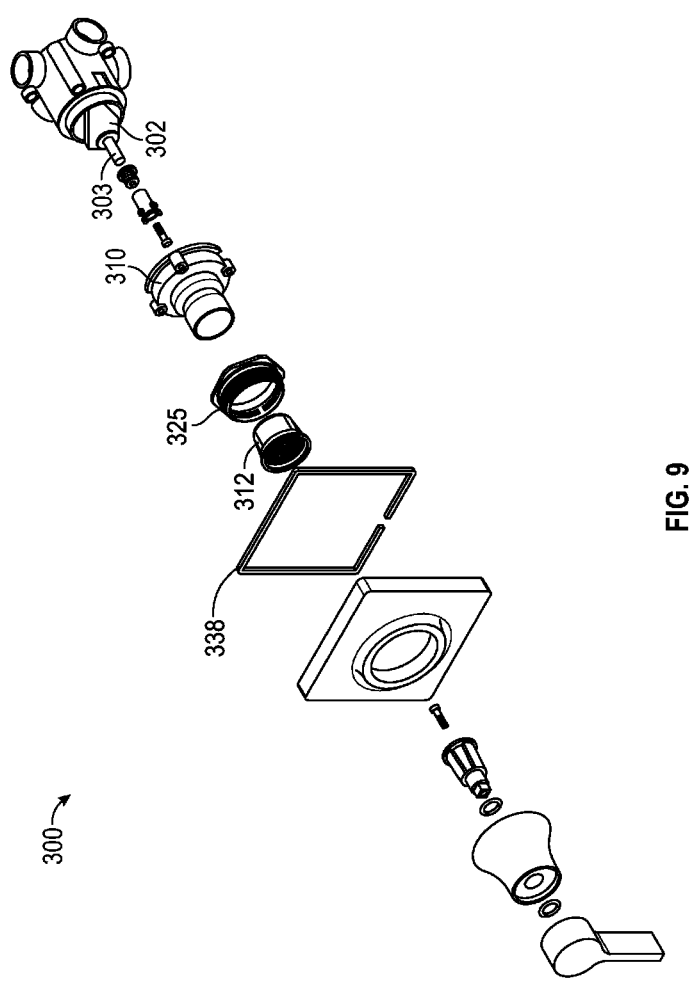
FIG. 9 is an exploded view of an uninstalled valve trim assembly, according to an exemplary embodiment.
Figure 10:
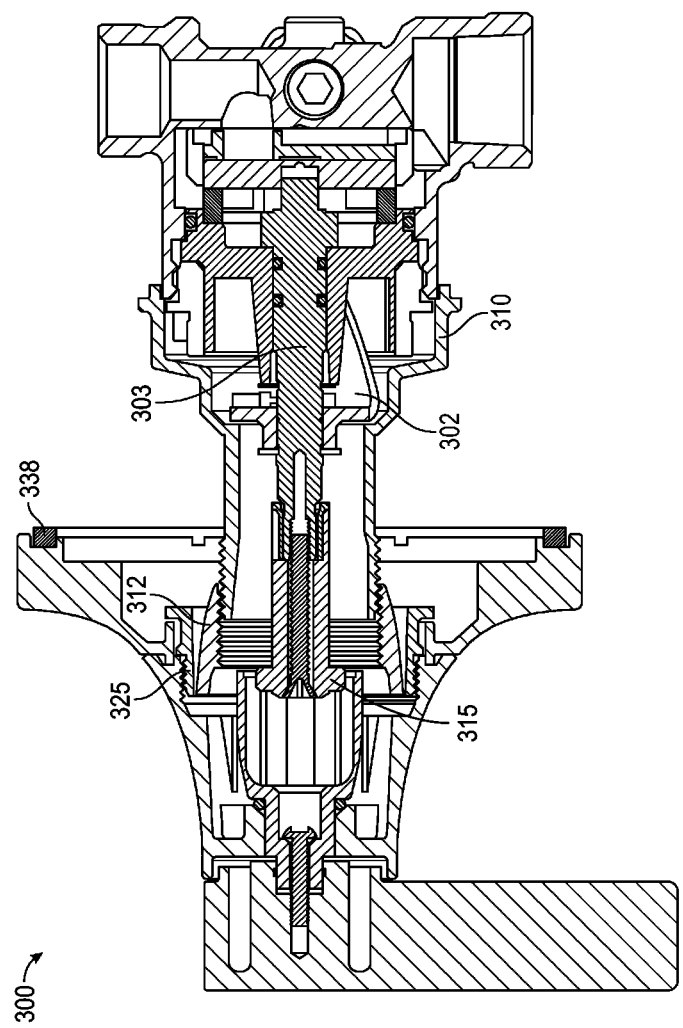
FIG. 10 is a cross-sectional side view of an uninstalled valve trim assembly, according to an exemplary embodiment.

Referring now to FIGS. 9 and 10, a valve trim assembly 300 is shown, according to an example embodiment. The valve trim assembly 300 may be similar to that of the valve trim assembly 100 and like terminology may be used to describe the valve trim assembly 300. The valve trim assembly 300 may being coaxially aligned along an axis. In some embodiments, the valve trim assembly 300 may not be coaxially aligned along the axis where some components may be offset from the axis. The valve trim assembly 300 includes an endcap 302 (e.g., end piece, mounting component, etc.). The endcap 302 is removably coupled to a valve stem 303 instead of being integrally formed with a valve assembly. Disposed around a perimeter of the valve trim assembly 300 is a gasket or seal, shown as seal 338. The seal 338 may be of a rectangular geometry such to encompass a covering of the valve trim assembly 300 and prevent water ingress. The valve trim assembly 300 may include a floating adapter 312 at least partially disposed within a locking nut 325. The floating adapter 312 and the locking nut 325 may be operatively coupled so that the combination of the floating adapter 312 and the locking nut 325 define a ball and socket (e.g., ball joint, etc.) to allow for rotational movement of a valve stem 303 upon assembly. Coupled to the floating adapter 312 is an adapter 310. The adapter 310 may house components of the valve trim assembly 300. The adapter 310 may be used for increased thread engagement between the floating adapter 312 and the adapter 310 so that the valve trim assembly 300 may have increased structural rigidity. The valve trim assembly 300 includes a joint 315 that is coupled over at least a portion of the valve stem 303. The joint 315 may be selectively repositionable within the valve trim assembly 300 to allow for components of the valve trim assembly 300 to be offset from perpendicular and maintain sealing. By way of example, the joint 315 may be a particular length such to attain a particular amount of thread engagement (e.g., increased length corresponds to decreased amount of thread engagement, etc.).

Figure 11:
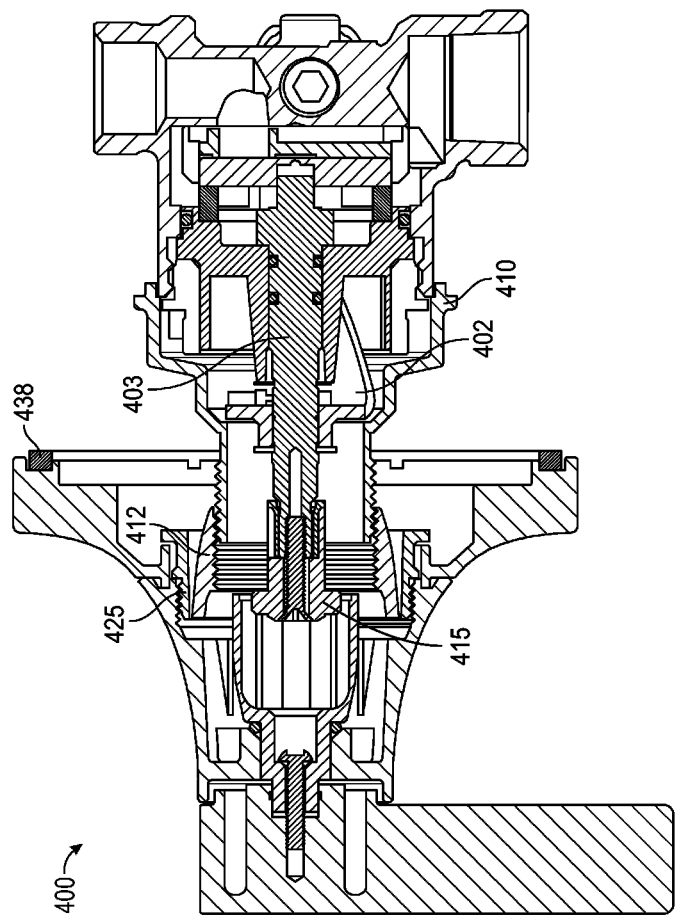
FIG. 11 is a cross-sectional side view of an uninstalled valve trim assembly, according to an exemplary embodiment.

Referring now to FIG. 11, a cross-sectional side view of a valve trim assembly 400 is shown, according to another example embodiment. The valve trim assembly 400 may be similar to that of the valve trim assembly 300 and like terminology may be sued to describe the valve trim assembly 400. The valve trim assembly 400 may being coaxially aligned along an axis. In some embodiments, the valve trim assembly 400 may not be coaxially aligned along an axis where some components may be offset from an axis. The valve trim assembly 400 includes an endcap 402 (e.g., end piece, mounting component, etc.). The endcap 402 is removably coupled to a valve stem 403 instead of being integrally formed with a valve assembly. Disposed around a perimeter of the valve trim assembly 400 is a gasket or seal, shown as seal 438. The seal 438 may be of a rectangular geometry such to encompass a covering of the valve trim assembly 400 and prevent water ingress. The valve trim assembly 400 may include a floating adapter 412 at least partially disposed within a locking nut 425. The floating adapter 412 and the locking nut 425 may be operatively coupled so that the combination of the floating adapter 412 and the locking nut 425 define a ball and socket (e.g., ball joint, etc.) to allow for rotational movement of a valve stem 403 upon assembly. Coupled to the floating adapter 412 is an adapter 410. The adapter 410 may house components of the valve trim assembly 400. The adapter 410 may be used for increased thread engagement between the floating adapter 412 and the adapter 410 so that the valve trim assembly 400 may have increased structural rigidity. The valve trim assembly 400 includes a joint 415 that is coupled over at least a portion of the valve stem 403. The joint 415 may be selectively repositionable within the valve trim assembly 400 to allow for components of the valve trim assembly 400 to be offset from perpendicular and maintain sealing. By way of example, the joint 415 may be a particular length such to attain a particular amount of thread engagement (e.g., increased length corresponds to decreased amount of thread engagement, etc.).

Referring now to FIGS. 9-11, the joint 315 and the joint 415 may substantially similar to one another, where a similar geometry may be used to define the joint 315 and the joint 415. By way of example, the joint 315 may be of a different length than the joint 415. According to an exemplary embodiment, the joint 315 is of a longer length compared to joint 415. In such an exemplary embodiment, the joint 315 is of a longer length because the adapter 310 is of a longer length compared to the adapter 410. In some embodiments, the joint 315 may be of a longer length compared to joint 415, where the adapter 310 is of a longer length compared to adapter 410.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the spline adapter 140 of the exemplary embodiment of FIG. 3 may be incorporated in the exemplary embodiment of FIG. 4. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A valve trim assembly for use in a shower environment, comprising:
    an escutcheon plate having a first axis disposed through a midpoint of the escutcheon plate;
    a nut coupled to the escutcheon plate; and
    a valve assembly at least partially disposed within the escutcheon plate and configured to control a flow of fluid, the valve assembly comprising:
        an adapter at least partially disposed within the nut and rotatable about the first axis; and
        an elongated joint coaxially aligned with the adapter;
    wherein the nut and the adapter cooperatively define a joint where the adapter rotates within the nut to maintain engagement between the escutcheon plate and a wall.

2. The valve trim assembly of claim 1, wherein the valve assembly further comprises a valve stem at least partially disposed within the elongated joint and a mixing valve housing threadably coupled to the adapter and coaxially positioned within the adapter.

3. The valve trim assembly of claim 2, wherein the adapter includes a first threaded interface positioned along an inner portion of the adapter, the first threaded interface engaged with a second threaded interface positioned along an outer portion of the mixing valve housing.

4. The valve trim assembly of claim 1, wherein the nut and the adapter are disposed along a second axis, the second axis offset from the first axis within a range of 0 to 30 degrees; and
    wherein the first axis intersects the second axis proximate the nut.

5. The valve trim assembly of claim 4, wherein the adapter is selectively repositionable within the nut to maintain the escutcheon plate in a fixed position when the second axis is offset from the first axis.

6. The valve trim assembly of claim 1, wherein the elongated joint is at least partially positioned within a cavity, the cavity disposed substantially parallel along the first axis; and
    wherein the elongated joint is repositionable within the cavity.

7. The valve trim assembly of claim 1, wherein the nut includes a third threaded interface positioned along an outer edge of the nut, the third engagement interface threadably coupled to the escutcheon plate.

8. The valve trim assembly of claim 1, wherein the escutcheon plate is coupled to a handle assembly and an escutcheon flange positioned between the handle assembly and the escutcheon plate, the handle assembly comprising a handle and selectively repositionable about the first axis.

9. The valve trim assembly of claim 1, wherein the escutcheon plate and the nut are coaxially aligned along the first axis where a sidewall of the nut extends parallel to the first axis; and
    wherein the nut is threadably coupled to a rearward side of the escutcheon plate.

10. A method of manufacturing a valve trim assembly, comprising:
    forming a nut having an annular body with a bore extending therethrough, the nut having a flange extending perpendicular from the body on a first end of the nut and a first threaded interface positioned at a second end of the nut;
    forming an adapter having an annular body with a second threaded interface disposed therein, the adapter having a flange extending perpendicular from a first end of the adapter, and the adapter defining a conical structure where a diameter of the first end of the adapter is greater than a diameter of a second end of the adapter;
    forming a valve stem having an elongated body; and
    forming a mixing valve housing, the mixing valve housing including a third threaded interface at least partially disposed on an external surface of the mixing valve housing.

11. The method of claim 10, further comprising:
    forming a joint having a flange extending radially outward from a center of the joint; and
    forming an escutcheon plate with a hollow cavity disposed within, the escutcheon plate having a first end with a first distance with a second end with a second distance;
    wherein the second distance is greater than the first distance.

12. The method of claim 11, wherein the escutcheon plate is coupled to a handle assembly and an escutcheon flange positioned between the handle assembly and the escutcheon plate, the handle assembly comprising a handle.

* * * * *